United States Patent
Inami et al.

[11] Patent Number: 5,254,148
[45] Date of Patent: Oct. 19, 1993

[54] METHOD OF MANUFACTURING DISTRIBUTED INDEX OPTICAL ELEMENTS

[75] Inventors: Minoru Inami, Hachiooji; Satoshi Noda, Akishima; Morinao Fukuoka; Yuko Kurasawa, both of Hachiooji, all of Japan

[73] Assignee: Olympus Optical Company Limited, Japan

[21] Appl. No.: 4,631

[22] Filed: Jan. 14, 1993

Related U.S. Application Data

[63] Continuation of Ser. No. 718,222, Jun. 20, 1991, abandoned.

[30] Foreign Application Priority Data

Jun. 20, 1990 [JP] Japan ................................. 2-162140
Sep. 26, 1990 [JP] Japan ................................. 2-256112
Apr. 11, 1991 [JP] Japan ................................. 3-106633

[51] Int. Cl.⁵ ......................................... C03B 37/016
[52] U.S. Cl. ...................... 65/3.11; 65/3.15; 65/18.1; 65/18.3; 65/31; 65/901; 501/12
[58] Field of Search ................ 65/3.11, 18.4, 3.15, 65/18.3, 17, 18.1, 31, 901; 501/12

[56] References Cited

U.S. PATENT DOCUMENTS

| | | | |
|---|---|---|---|
| 4,110,096 | 8/1978 | Macedo et al. | 65/31 X |
| 4,220,461 | 9/1980 | Samata | 65/17 |
| 4,302,231 | 11/1981 | Macedo et al. | 65/31 X |
| 4,324,576 | 4/1982 | Matsuyama et al. | 65/3.11 X |
| 4,389,233 | 6/1983 | Korosaki et al. | 65/901 X |
| 4,417,910 | 11/1983 | Passaret | 65/901 X |
| 4,436,542 | 3/1984 | Kurosaki et al. | 65/901 X |
| 4,789,389 | 12/1988 | Schermerhorn et al. | 65/17 X |
| 5,123,940 | 6/1992 | DiGiovanni et al. | 65/3.12 |

Primary Examiner—Robert L. Lindsay
Attorney, Agent, or Firm—Bruce L. Adams; Van C. Wilks

[57] ABSTRACT

A method of manufacturing distributed index optical elements is disclosed. The method comprises a step of preparing silica sol including at least one of metal dopants, a step of dipping, after subjecting the silica sol to a gelling treatment, the silica gel in an elute into which a part of metal constituents other than silicon including in the gel is selectively eluted, and a step of drying and sintering the silica gel.

22 Claims, 11 Drawing Sheets

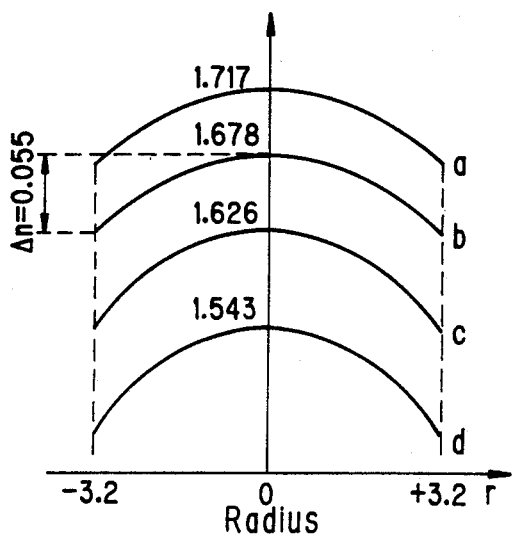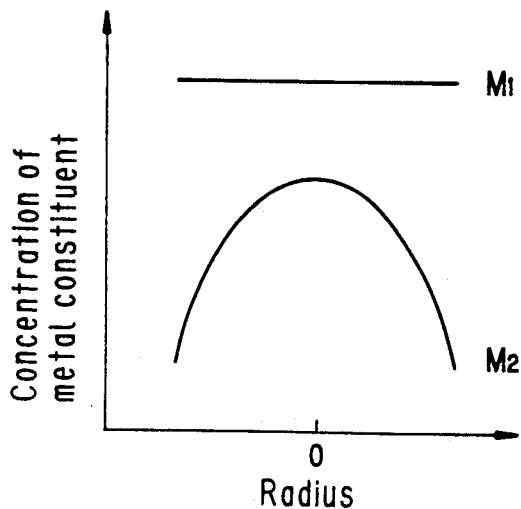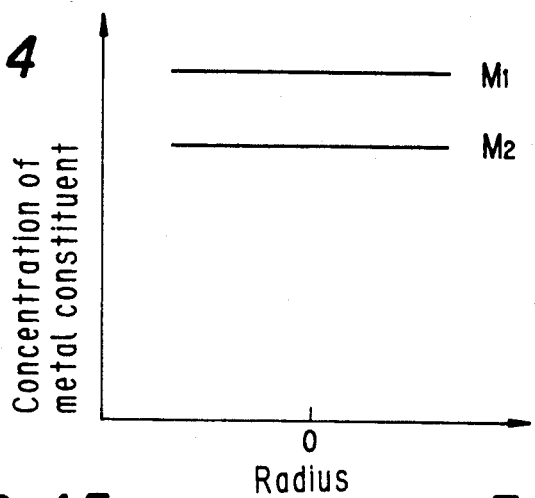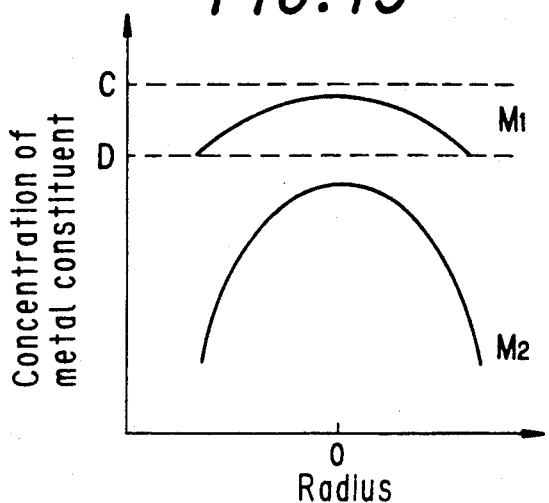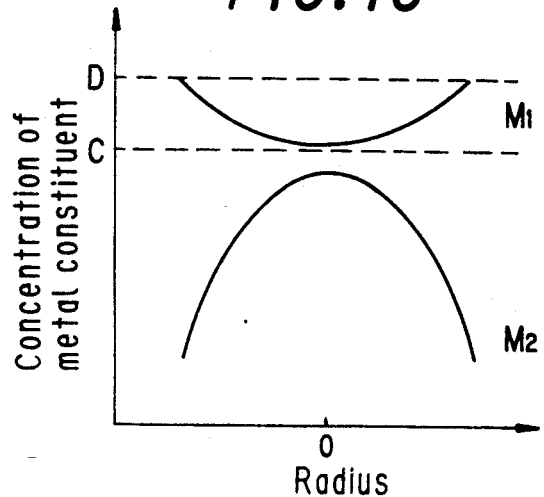

METHOD OF MANUFACTURING DISTRIBUTED INDEX OPTICAL ELEMENTS

This is a continuation of parent application Ser. No. 718,222 filed Jun. 20, 1991 abandoned.

BACKGROUND OF THE INVENTION

The present invention relates to a method of manufacturing distributed or graded index optical elements.

As a method of manufacturing distributed index optical elements, hitherto, there has been known a sol-gel method in which silicon alkoxide $Si(OR)_4$ (R: alkyl radical) is used as the raw material. In a method of obtaining distributed index optical elements by the sol-gel method, silica sol including at least one of metal dopants is prepared, after subjecting the silica sol to a gelling treatment, this wet silica gel is dipped in a solution such as an acid capable of solving the above metal consituent, and then the silica gel is dried and sintered.

As a method of imparting concentration distribution by inducing the above metal constituents as metal alcoxide $M(OR')n$, an article "r-GRIN Glass Rods Prepared by a Sol-Gel Method" disclosed in Journal of Non-Crystaline Solids 100 (1988) pps. 511-513 is well known. In this method, it is considered that when the sol is prepared and made gelling, the metal constituent (M) is made a bond of silicon (Si) and M—O—Si bond in the gel. The distributed index is produced by the distributed or grated concentration of the metal constituent, so that in order to give distributed index, the concentration distribution of the metal constituent must be obtained by dipping the wet gel into a solution such as an acid.

As a method of inducing the above matal constituent as a metallic salt, there has been well known Journal of Non-Crystalline Solids 85 (1986) pps. 244-246. In this case, it is considered that the method of fixing the metal constituent into the gel and the method of eluting the metal constituent from the gel are different from the case of taking the metal alcoxide in as the metal constituent, and the metal constituent is taken in the gel in the form of metallic salt $M_iX_j$ and thus separated out and deposited in gel pore wall in the form of crystallite. That is, it is considered that the metal constituent (M) does not form a bond of M—O—Si with the silicon (Si) in the gel. In this case, in order to give distributed index, the wet gel is dipped into a solution capable of solving the metallic salt, and again separated out in the gel as crystallite of the metallic salt.

In either the above conventional methods, one of metal dopants other than silicon is used and distributed index optical elements is are obtained by imparting concentration distribution of the metal constituents.

As the conventional method other than the above method, there is known U.S. Pat. No. 4,797,376. This U.S. Patent is a method of manufacturing distributed index optical elements performed by using, in addition to silicon and metal dopants for imparting distributed index, metal dopants for stabilizing glass as third constituent, and having the same function as the previous method using the metal alcoxide.

However, the conventional methods have following problems.

(1) In case of using only one of metal dopants in addition to silicon, difference $\Delta n$ of refractive indexes can be controlled by adjusting distributed index imparting conditions, such as amount of metal constituent, concentration of distributed index imparting solution, time of dipping the gel in distributed index imparting solution or the like, but even though difference $\Delta n$ of desired refractive index can be obtained, whole refractive index can not be shifted with any width.

(2) In case of using two of metals in addition to silicon, the metal dopants other than the metal dopant having large contribution on refractive index are added to effect glass stabilization but the contribution of these metal dopants on optical characteristics (refractive index and dispersion) of glass is small, resulting in less variations of obtained distributed index optical elements.

(3) In case of using two of metals in addition to silicon, when distributed index imparting conditions are determined so as to make them best for one of metals, the distributed index imparting conditions of the other of metal dopants are determined automatically, for control of the distribution, the shape in variation of concentration distribution of two or more metal dopants can not be obtained.

SUMMARY OF THE INVENTION

It is an object of the present invention to overcome the above described disadvantages of method of manufacturing distributed index optical elements.

It is another object of the present invention to provide distributed index optical elements in which desired concentration distribution can be imparted to respective metal dopants other than silicon, thereby changing the refractive index and dispersion characteristics of the base or characteristics of the center portion, variously.

According to the present invention, there is provided a method of manufacturing distributed index optical elements comprising a step of preparing silica sol including at least one of metal dopants, a step of dipping, after subjecting the silica sol to a gelling treatment, the silica gel in an elute into which a part of metal constituents other than silicon including in the gel is selectively eluted, and a step of drying and sintering the silica gel.

In order to control eluting speed of metal constituents in the gel, at least either one of following eluting methods is repeated at least one time.

(1) At least one of metal dopants is provided by at least one of metal alkoxide and at least one of metallic salts are provided, and after forming gel thereof, concentration distribution of metallic consituents is imparted to only the metal provided by the metallic salt (hereinafter, referred to as eluting method (1)).

(2) As the metal dopants, at least two of metal dopants are provided by metal alkoxide respectively, only a part of metal dopants of these metal dopants is selectively eluted. That is, as the metal dopants, at least one of metal dopants is selected from a metal dopant group having small eluting speed {Nb and Ta} and at least one of metal dopants is selected from another metal dopant group {Ti, Zr, La, Y, Ge, Pb, Ba, Sr, Ca and Zn}, and then these selected metal dopants are provided from metal alkoxide and after forming gel, concentration distribution is imparted only the later metal dopant (hereinafter, referred to as eluting method (2)).

(3) As the elute, a solution including at least one of metal dopants included in the silica gel such as an acid is used (hereinafter, referred to as eluting method (3)).

Therefore, the concentration distribution of metal constituent is imparted by these eluting methods, resulting in obtaining optical elements having various optical characteristics.

BRIEF DESCRIPTION OF THE DRAWINGS

FIGS. 8, 11 and 12 are explanatory views explaining concept of second method (2) of manufacturing distributed index optical elements according to the present invention;

FIG. 13 is an explanatory view showing concentration distribution of metal constituent in case of dipping the metal in a solution in which concentration C of metal constituent M1 in gel and concentration D of metal constituent have a relationship C=D;

FIG. 14 is an explanatory view showing concentration distribution of metal constituent in gel before dipping the metal in elute;

FIGS. 15 and 16 are explanatory views showing concentration distribution of metal constituent in case of diffing the metal in a solution when concentrations have relationship C>D and C<D;

DETAILED EXPLANATION OF THE PREFERRED EMBODIMENT

When the above method (1) is used, follwing effects are exhibited.

In case of using silicon alcoxide $Si(OR)_4$ and metal alkoxide $M(OR')_n$ as the raw material, and preparing sol and gelling the sol, it is considered that the alkoxide causes hydrolytic reaction as well as dehydration and condensation reactions, so that metal M forms a strong chemical bonding as M—O—Si together with silicon (Si) in the gel. Therefore, in order to impart compositional distribution to metal M, it is necessary to cut this bonding, so that a method of dipping gel in an acid is adopted.

While when silicon alkoxide $Si(OR)_4$ and metallic salt $MiXi$ are used to form gelling, the above bonding M—O—Si does not exist in gel, but metal ion $M^{k+}$ is only present in solvent of the gel. Therefore it is considered that the metal ion $M^{k+}$ can easily be replaced with another cation and the gel is only dipped in a solvent for dissoluing metallic salt, thereby difusing metal ion $M^{k+}$ easily and thus imparting compositional distribution.

In this way, it is considered that techique and mechanism for imparting compositional distribution are different by the feeding raw material of metal M.

The method (1) is to obtain distributed index optical elements having different properties which was difficult to realize, by using both metal alkoxide and metallic salt as metal inducing raw material and selectively imparting compositional distribution of only one thereof at the stage of imparting compositional distribution with the utilization of the above characteristics.

More specifically speaking initially, as the raw material in preparation of sol, silicon alkoxide $Si(or)_4$, metallic salt MiXi for imparting concentration distribution, alkoxide $M(Or)'_n$ of the same metal sheeds as the metallic salt and metal alkoxide $M'(OR^-)_n'$ of different metal are used to form gel with molar fraction of 100-(x+y+z), x, y, z as shown in Table 1. Then, by dipping the thus formed gel in a solvent by which metallic salt came be dissolved but —M—O—Si—, —M'—O—Si— bonding can not be cut out, such as water, alcohol or the like, the compositional distribution imparting can not be performed by metallic salt induced with metal alkoxide but performed by only metallic salt induced with salt.

TABLE 1

| compound | molar ratio |
|---|---|
| $Si (OR)_4$ | 100 − (x + y + z) |
| $MiXj$ | x |
| $M (OR')_n$ | y |
| $M' (OR')_n$ | z |

Figure 1:
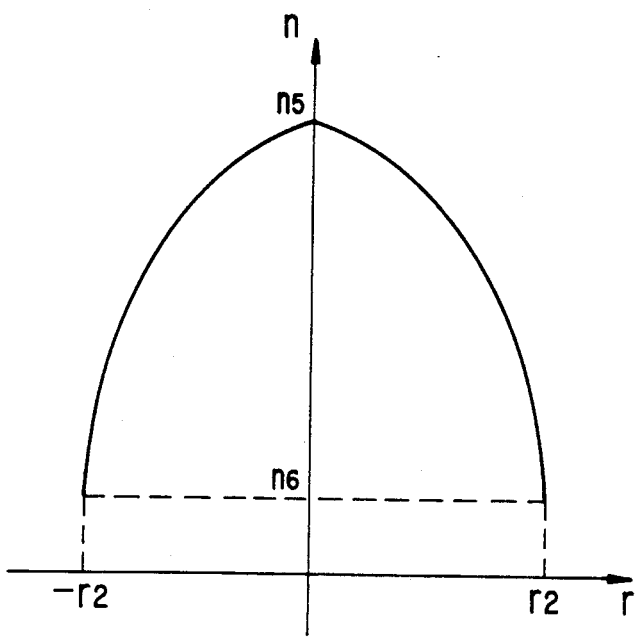
FIGS. 1 to 7 are explanatory views explaining the functions of a first method (1) of manufacturing distributed index optical elements according to the present invention, respectively.
Figure 2:
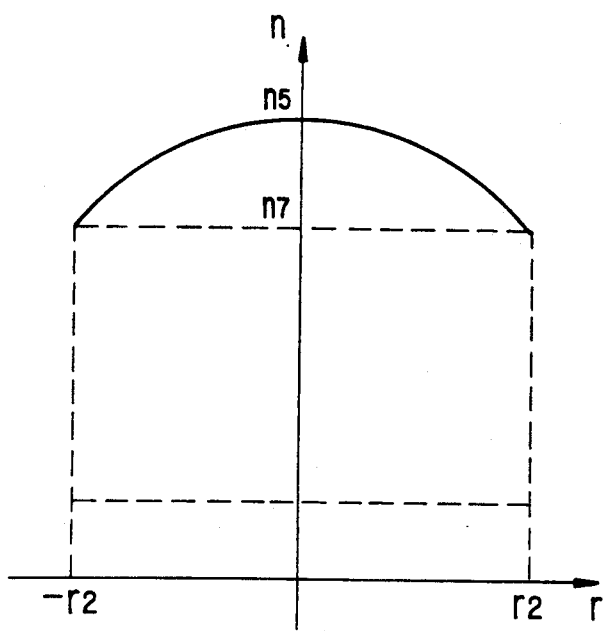

That is, the compositional distribution of metal M shown in FIG. 2 can be controlled so as to make refraction difference $\Delta n$ small while remaining the center portion $n_5$ substantially the same, as compared with the case of inducing only one metal raw material (see, FIG. 1), since the portion induced with alkoxide is not eluted, and the portion induced with metallic salt is only eluted.

A great number of distributed index optical elements can be obtained by further applying this method (1).

Figure 3:
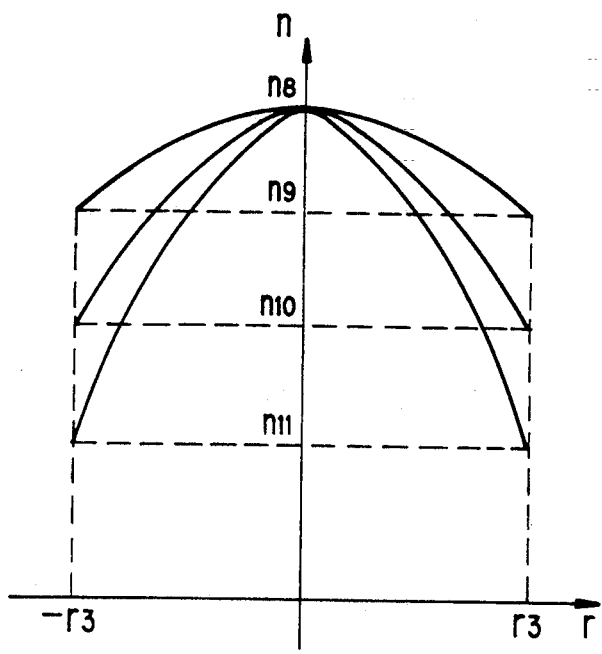

At first, provided that for the molar ratio of the compound shown in Table (1), if z=0 or z is made constant, $x+y$ is made constant and x or y is changed, as shown in FIG. 3, the magnitude of refractive difference $\Delta n$ can be controlled while remaining the magnitude of $n_8$ constant. That is, provided that a curve of refractive index distribution in the radial direction is $n=ar^2+b$ (a parabola), a may be controlled with constant b.

Figure 4:
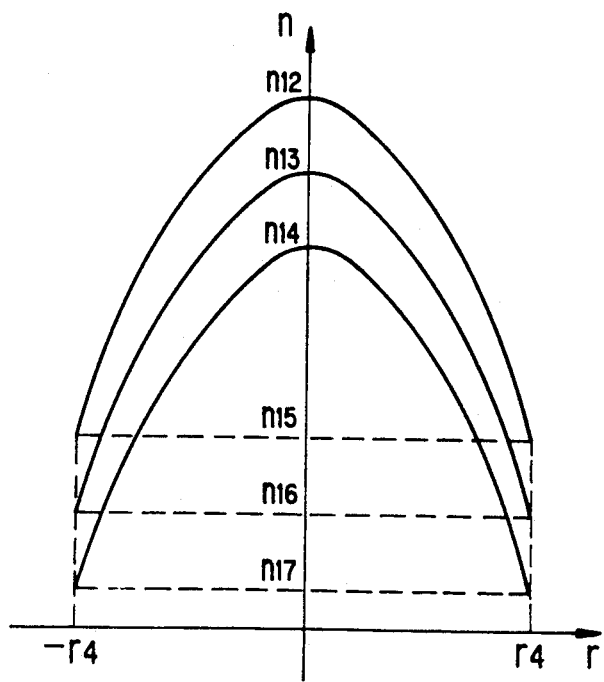

Secondly, when z is changed with constant x and y, or y is changed with constant x and z, as shown in FIG. 4, refractive index of center portion can be controlled while remaining the difference $\Delta n$ constant. That is, for the curve of refractive index distribution in the radial direction being $n=ar^2+b$, b can be controlled with constant a.

Also, if both a and b are simultaneously controlled, that is, x, y and z are changed in arbitrary manner, for refractive index distribution curve ($n=ar^2+b$) a and b can be controlled in arbitrary manner within vitrification range.

Figure 5:
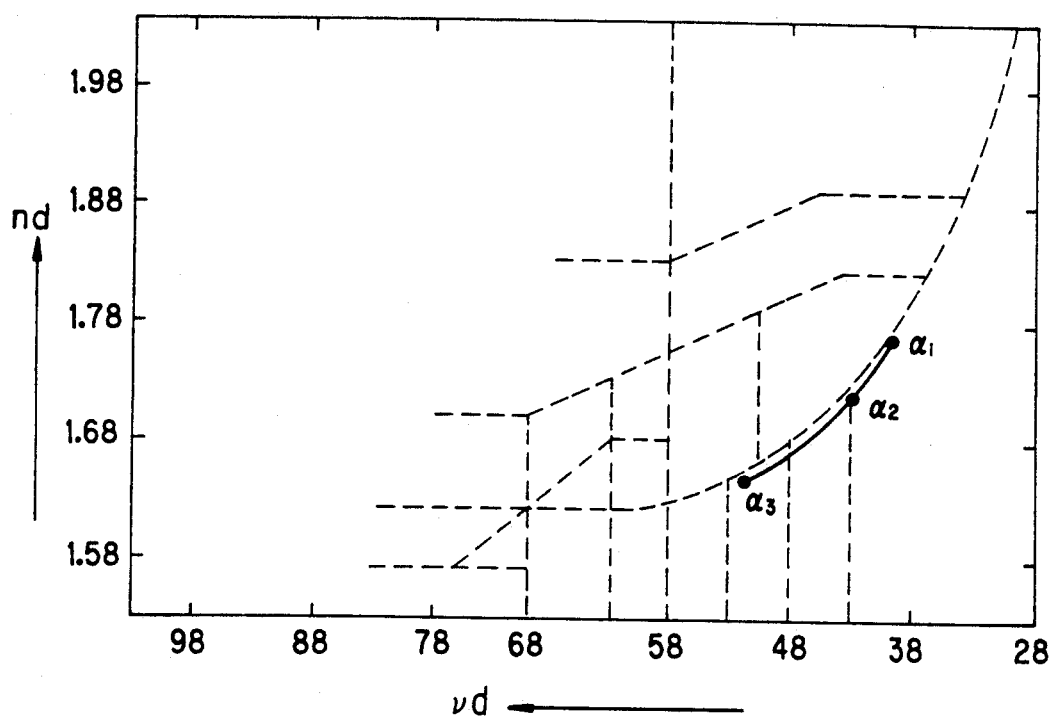
Figure 6:
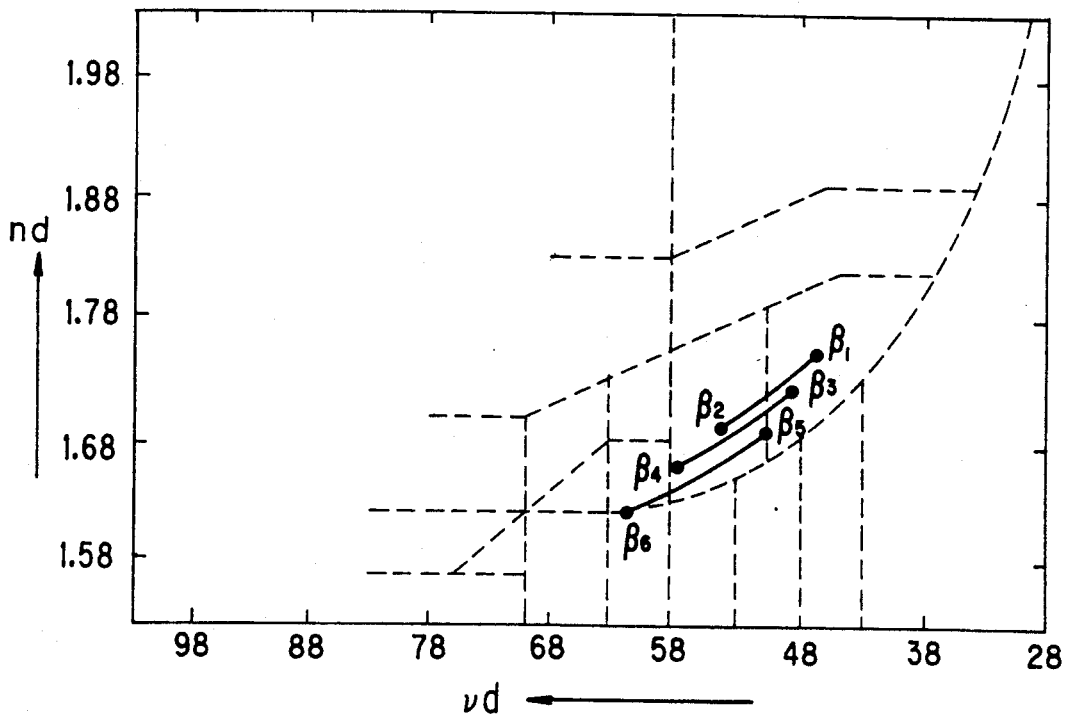
Figure 7:
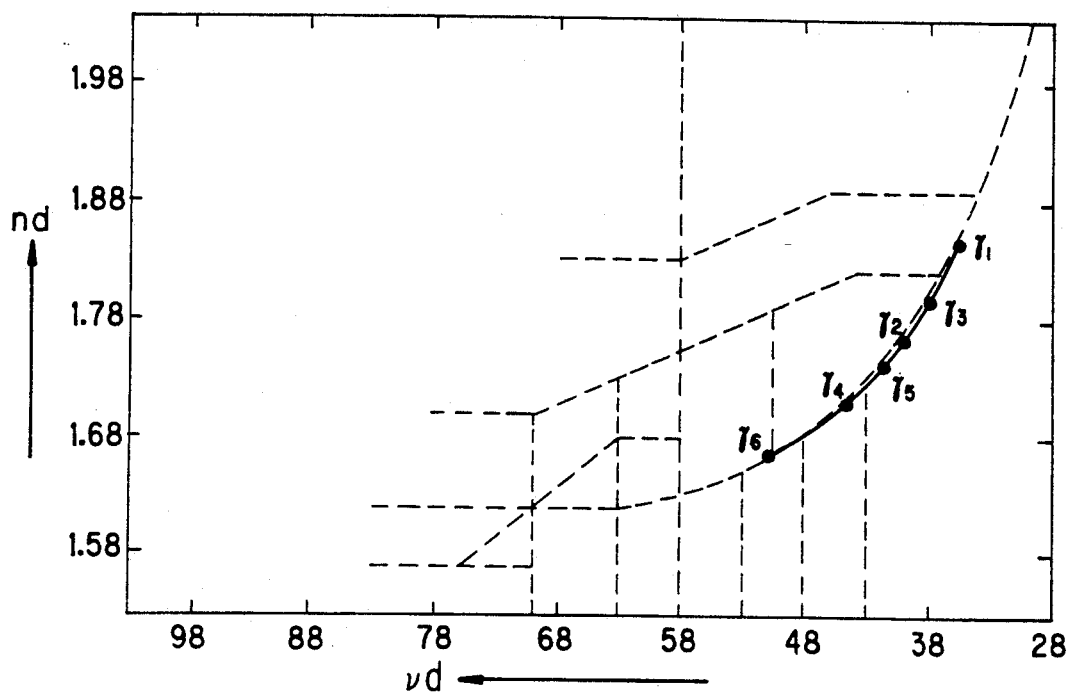

Moreover, if above described properties are designated with Vd-nd graph (Able number-refractive index graph) by taking dispersion for expressing property of optical glass into consideration, the refractive index distributions shown in FIGS. 1 and 2 can be denoted by segments $\alpha_1\alpha_3$ and $\alpha_1\alpha_2$ shown in FIG. 5 respectively. Also, when three refractive index distributions shown in FIG. 4 may be obtained by changing parameter z, respective distributions vcan be denoted on Vd-nd graph by segments $\beta_1\beta_2$, $\beta_3\beta_4$ and $\beta_5\beta_6$ shown in FIG. 6, respectively in order of magnitude of center refractive index. If the above three refractive index distributions may be obtained by changing parameter y, these distributions can be denoted by segments $\gamma_1\gamma_2$, $\gamma_3\gamma_4$ and $\gamma_5\gamma_6$, shown in FIG. 7 respectively in order of magnitude of center refractive index. In this way, refractive index difference $\Delta n$ and dispersion property can be changed variously by changing amount and kinds of salt and alkoxide.

When the above method (2) is used, following effects are exhibited. The properties that eluting speed of metal constituent in gel in case of dipping wet gel including metal constituent in eluation such as acid or the like is remarkably different by induced metal dopant, are found with the result of various studies and examines. That is, it is found that gel including metal of low eluting speed representative of Nb an Ta is almost equally distributed in concentration as compared with other metals, since even through the dipping time is increased in the dipping course into acid, the metal of Nb and Ta may not substantially be eluted so that a convex distribution of metal constituent can not be obtained.

The method (2) is to obtain distributed index optical elements having variously changed refractive indices and discription properties, by using at least two metal alkoxides other than silica and obtaining metal contituent distributions of different shapes for respective metal in the distribution imparting course.

In case of silicon alkoxide $Si(OR)_4$ and at least two metal alkoxides $M^1(OR')_n$, $M^2(OR^-)_m$ - - - as the raw material to prepare sol and to make the sol gelling, it is considered that metal constituent ($M',M^2$ - - -) forms a bonding as $M'-O-Si$, $M^2-O-Si$ together with silicon (Si) in the gel by hydrolytic reaction as well as dehydration and condensation reactions of alkoxide.

Refractive index distribution imparting is performed by the fact that the bonding is cut off by dipping the gel in a solution capable of eluting metal such as acid, thereby eluting metal constituent and the concentration distribution is imparted to metal dopant ($M^1,M^2$ . . .).

The eluting speed ($v^1$, $v^2$ . . .) of metal dopant ($M^1$, $M^2$ . . .) depends on the bonding state of metal in the gel, kinds of eluation, concentration thereof or the like, and determined by the cutting speed of bonding of metal and silicon by oxygen and the diffusing or dispersing speed of metal ion in gel solvent after cutting off of the bonding. Even though kinds and concentration of eluation are constant, therefore, the eluting speed in different by metal dopant ($M^1$, $M^2$ . . .). If metal dopants ($M^1$, $M^2$ . . .) having different eluting speed are used, the consentration distributions of metal dopant ($M^1$, $M^2$ . . .) having different distribution shapes exist in the gel.

Figure 8:
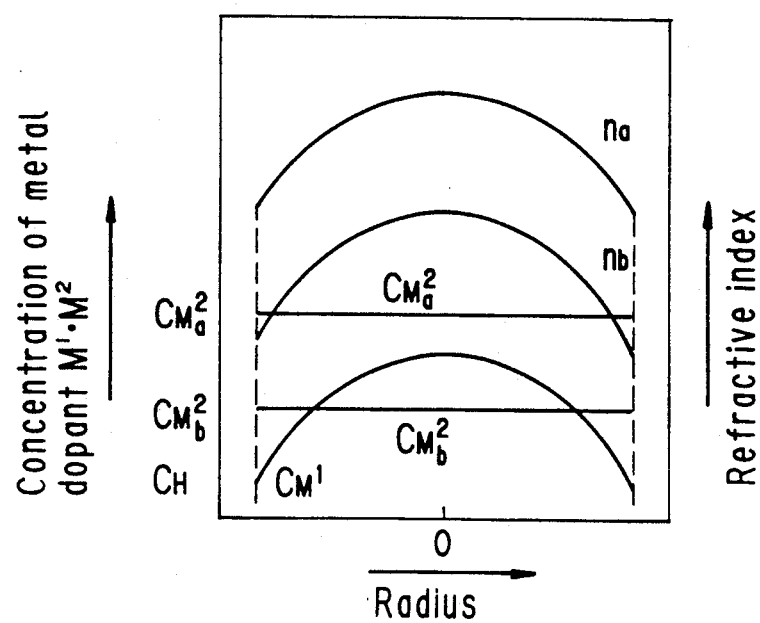
Figure 9:
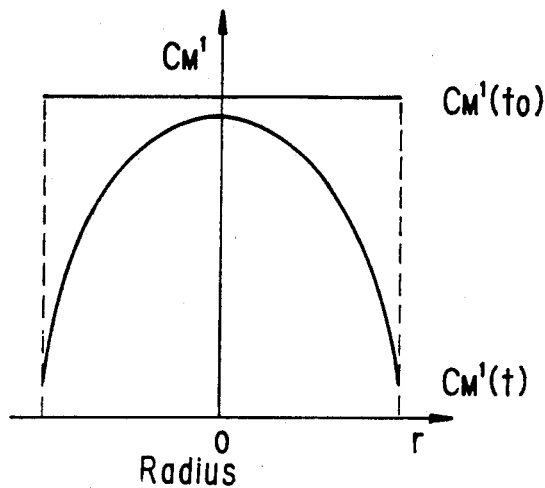
FIGS. 9 and 10 are explanatory views showing concentration distribution of metal constituent in gel obtained by dipping it into a concentration distribution imparting solution.
Figure 10:
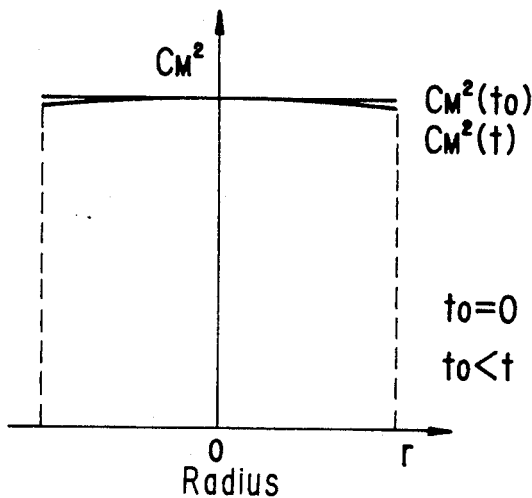
Figure 11:
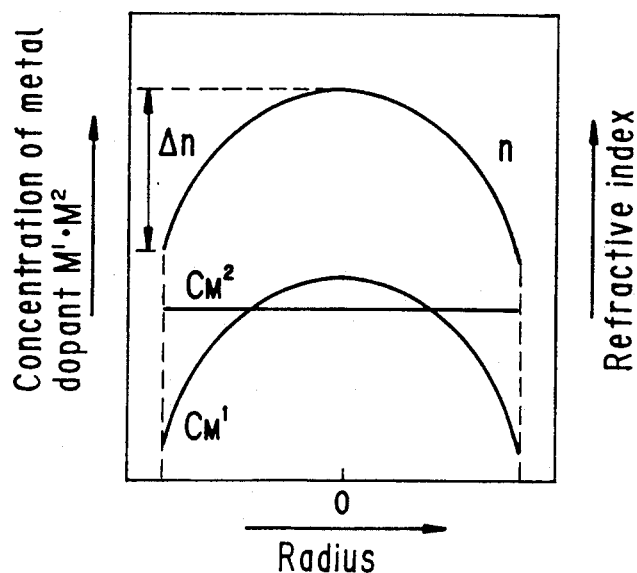

If gel including two kinds of metal dopants having two remarkably different eluting speeds ($M^1$, $M^2$; $v^1>>v^2$) are subjected to concentration distribution imparting treatment, the metal dopant ($M^1$) having high eluting speed has large concentration difference between center portion and peripheral portion of the gel and distributed in the convex shape (FIG. 9), while another metal dopant ($M^2$) having low eluting speed has very small concentration difference between center portion and peripheral portion of the gel and has substantially flat concentration distribution (FIG. 10). Thus obtained glass has refractive difference due to concentration distribution of metal dopant ($M^1$) and refractive index of base portion due to concentration of center portion of metal dopant ($M^1$) and flat concentration distribution of metal dopant ($M^2$) (FIG. 11). Refractive index as base of a convex refractive index distribution due to concentration distribution of metal dopant ($M^1$) can be variously changed by changing the amount of metal dopant ($M^2$) having low eluting speed (FIG. 12). While as previously described, refractive index difference can be controlled by the change in amount of metal dopant ($M^1$) having high eluting speed, the change in dipping time or the like (FIG. 8), if these changes are combined, it can be obtained various distributed index optical elements changed with various variations of refractive index distribution which can not be obtained by conventional methods.

According to the method (2), not only refractive index but also dispersion property can be variously changed by selecting kinds and amount of metal dopants ($M^1$, $M^2$ . . .).

Finally, when the method (3) is used, following effects are exhibited.

In case of importing refractive index distribution by plurality of metal constituents $M^1$, $M^2$, eluting of metal constituent $M_1$ is limited by including at least one metal constituent $M_1$ in eluation in which metal constituents including in gel are eluted. In this case, concentration distribution of metal constituent $M_1$ in the gel can be controlled by changing concentration of metal constituent $M_1$ included in eluation, thereby imparting desired refractive index distribution.

The concentration distribution of metal constituent in gel before dipping it in elution is shown in FIG. 14. When this gel is dipped in a solution in which the concentration C of metal constituent $M_1$ included in gel is equal to concentration D of metal constituent $M_1$ in the elution (C=D), metal constituent $M_1$ is not eluted, but metal constituent $M_2$ is eluted, thereby imparting concentration distribution with metal constituent $M_2$ as shown in FIG. 13 and thus forming reference index distribution.

In case of dipping the gel in a solution in which the concentration D of metal constituent $M_1$ in the eluation is lower than the concentration C of metal constituent $M_1$ included in the gel (C>D), eluting of metal constituent $M_1$ is limited, the metal constituent $M_1$ can not be eluted over the concentration thereof in the elution, but the metal constituent $M_2$ is eluted, thereby imparting concentration distributions to it with metal constituents $M_1$, $M_2$ as shown in FIG. 15 and thus forming refractive index distribution. In this way the concentration distribution of metal constituent $M_1$ can be controlled within the tange shown in FIGS. 13 and 15, by changing the concentration D of metal constituent $M_1$ in the eluation, so that desire refractive index distribution can be imparted.

In case of dipping the gel in a solution in which the concentration D of metal constituent $M_1$ in the eluation is higher than the concentration C of metal constituent $M_1$ included in the gel (C<D), metal constituent $M_1$ in the eluation is induced in the gel, metal constituent $M_2$ in the gel is eluted, thereby imparting concentration distribution to it with metal constituents $M_1$, $M_2$ as shown in FIG. 16 and thus forming refractive index distribution. In this way, the concentration distribution of metal constituent $M_1$ can be controlled within the range shown in FIGS. 13 and 16, by changing the concentration D of metal constituent $M_1$ in the eluation, so that desired refractive index distribution can be imparted.

The above described metal constituents $M_1$, $M_2$ are not limited to two kinds of metal constituents. When metal constituent which is not included in the gel is included in the eluation, the imparting step of refractive index distribution and the inducing step of metal constituent into the gel can be performed simultaneously, so that number of steps can effectivelly be reduced.

FIRST EMBODIMENT

In order to obtain a molar ratio 80:20 of silica ($SiO_2$) constituent and titania ($TiO_2$) constituent, 3.40 g (0.01 mol) of titanium tetra-n-buthoxide $Ti(O^nC_4H_9)_4$ was added in 40.5 ml of a methanal solution which includes 12.17 g (0.08 mol) of silicon tetramethoxide $Si(OCH_3)_4$ and 6.0 ml of aqueous solution which includes 1.89 g (0.01 mol) of titanium tetrachloride $TiCl_4$, was added in the methanol solution, and then 3 ml of 1N (1 Normality)—aqueous ammonia solution was added in the mothanol solution to prepare the sol. This sol was poured in a polypropylene container having an inner diameter of 18 mm and it was left to stand and thereafter a wet gel was obtained.

Then, thus obtained wet gel structure was taken out of the container and dipped in aqua pura which was a solvent for dissolving the titanium tetrachloride for two hours, thereby imparting concentration distribution of titanium constituent.

Figure 17:
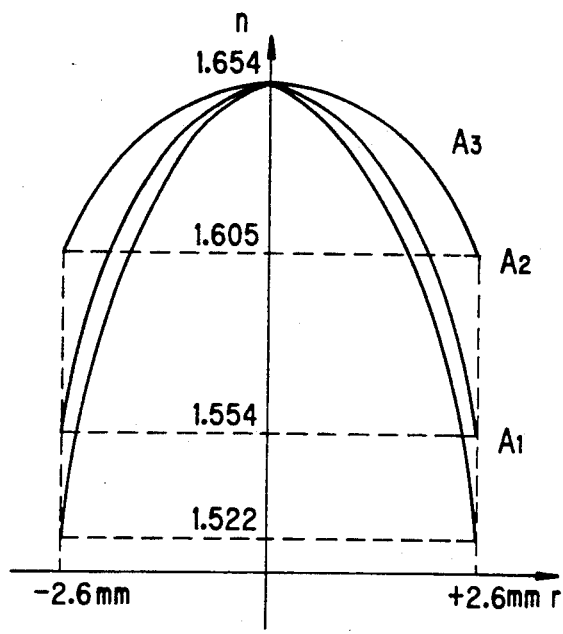
FIG. 17 is an explanatory view showing first embodiment of the method according to the present invention.

After imparting concentration distribution of titanium tetrachloride, it was washed in a solution acetone which does not dissolve titanium tetracholoride, and thus washed gel was dried and calcined, thereby obtaining a glass body having a diameter of 5.2 mm. then, a diametric refraction index distribution of this glass body was measured and it is found that this glass body has a parabolic refraction index distribution having its property of ndo=1.654 at the center portion, nd=1.554 at peripheral portion and a refraction index difference $\Delta n = 0.100$, as in FIG. 17 by a curve $A_2$.

Then, at the time of the sol preparation, for 20 mol % of titanum constituent, the compositional ratio was 10 mol % of $Ti(O^nC_4H_9)_4$ and 10 mol % of $TiCl_4$. This compositional ratio was changed to following ratio, that is, $Ti(OnC_4H_9)_4:TiCl_4 = 5:15$ (a) and 15:5 (C). The wet sol structure having this new compositional ratio was subjected to the concentration index distribution imaparting treatment in the same manner as the above treatment, thereby forming a glass body. Then, a diametric refraction index distribution of this body was measured. As a result of this measurement, this glass body has a refraction index distribution as in FIG. 17 by curves a and $A_3$ so that for the refraction index curve $n = a\gamma^2 + b$, the parameter a can be changed and thus controlled with the parameter b being made constant.

SECOND EMBODIMENT

In order to obtain compositional ratio 80:10:10 of $SiO_2$ constituent, PbO constituent and $ZrO_2$ constituent, zirconium tetra-n-butoxide ($O^nC_4H_9$)$_4$ of 0.01 mol was added to an ethanol solution including silicon tetraethoxide $Si(OC_2H_5)_4$ of 0.08 mol, to which ethanol solution aqueous solution including lead nitrate $Pb(NO_3)_2$ of 0.01 mol was added and thereafter 1N-hydrochloric acid was added to prepare the sol. This sol was poured in a polypropylene container having an inner diameter of 18 mm and it was left to stand and thereafter a wet gel was obtained.

Figure 19:
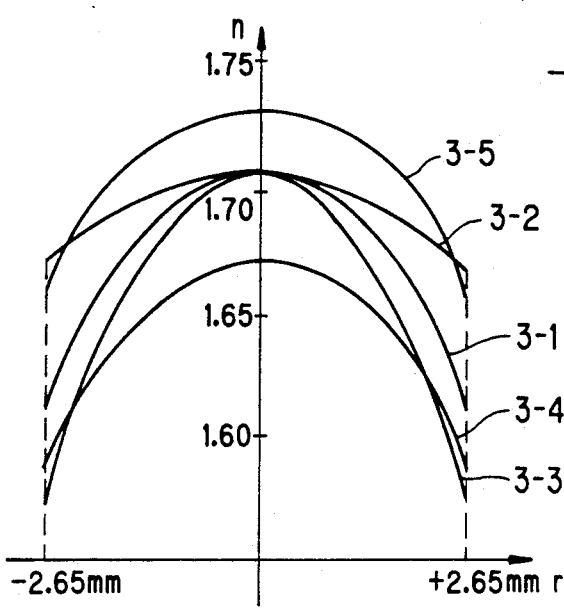
FIGS. 19 and 20 are views third embodimet.

Then, thus obtained wet gel structure was taken out of the container and dipped in aqua pura to dissolve the lead nitrate, thereby imparting concentration distribution of Pb constituent. After imparting concentration distribution of Pb constituent, it was washed in a solution of isopropanal and the thus washed gel was dried and calcined, thereby obtaining a glass body having a diameter of 5.1 mm. A diametric refraction index distribution of this glass body was measured and it is found that this glass body has a refraction index distribution as in FIG. 19 by a curve $B_1$.

Figure 18:
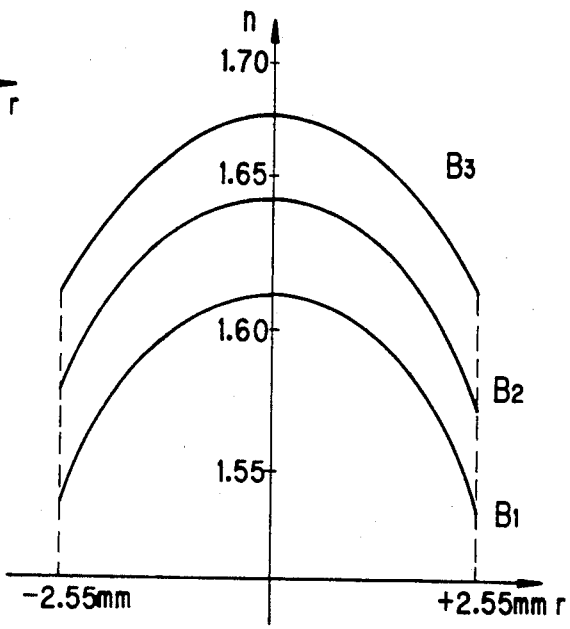
FIG. 18 is an explanatory view showing second embodiment of the method according to the present invention.

Next, at the time of the sol preparation, for constant 10 mol % of Pb constituent, ratios 75:15 and 70:20 of $SiO_2$ constituent and $ZrO_2$ constituent were obtained. The wet sol structures having these new ratios were subjected to the concentration distribution inparting tratment in the same manner as the above treatment, thereby forming a glass body. Then, a diamettric refraction index distribution of this glass body was measured. As a result of this, the glass has a refraction index distribution as in FIG. 18 by curves $B_2$ and $B_3$, so that for the refraction index distribution curve $n = a\gamma^2 + b$, the parameter b can be changed and thus controlled with the parameter a being made constant.

THIRD EMBODIMENT

In order to obtain compositional ratio 70:20:10 of $SiO_2$ constituent, $TiO_2$ constituent and $ZrO_2$ constituent, $Ti(O^nC_4H_9)_4$ of 0.01 mol, $TiCl_4$ of 0.01 mol and $Zr(OnC_4H_9)_4$ of 0.01 mol were added in an ethanol solution including $Si(Oc_2H_5)_4$ of 0.07 mol to which ethanol solution 1N-hydrochloric acid was added to prepare the sol. This sol was poured in a polypropylene container having an inner diameter of 18 mm and it was left to stand and thereafter a wer gel was obtained.

Next, the thus obtained wet gel structure was taken out of the container and dipped in aqua pura to dissolve $TiCl_4$, thereby imparting concentration distribution of Ti constituent. After concentration distribution imparting treatment of Ti constituent, it was washed in a solution of acetone and the thus washed gel was dried and calcined, thereby obtaining a glass body having a diameter of 5.3 mm. A diametric refraction index distribution of this glass body was measured and it is found that this glass body has a refraction index distribution as in FIG. 19 by a curve 3-1.

Then, at the time of the sol preparation, the conpositional ratios were changed as in Table 2. The wet sol structures having such compositional ratios were subjected to the concentration distribution inparting treatment and the diametric refraction index distribution measurment, thereby obtaining refraction index distribution curces as in FIG. 19.

TABLE 2

| Example Number | Compositional ratio (mol %) | | | |
|---|---|---|---|---|
| | Si (OC$_2$H$_5$)$_4$ | Ti (O$^n$C$_4$H$_9$)$_4$ | TiCl$_4$ | Zr (O$^n$ C$_4$H$_9$)$_4$ |
| 3-1 | 70 | 10 | 10 | 10 |
| 3-2 | 70 | 15 | 5 | 10 |
| 3-3 | 70 | 5 | 15 | 10 |
| 3-4 | 75 | 10 | 10 | 5 |
| 3-5 | 65 | 10 | 10 | 15 |

In this way, by changing compositional ratio, for the refraction index distribution curve $n = a\gamma^2 + b$, parameters a and b can be changed and thus controlled.

Figure 20:
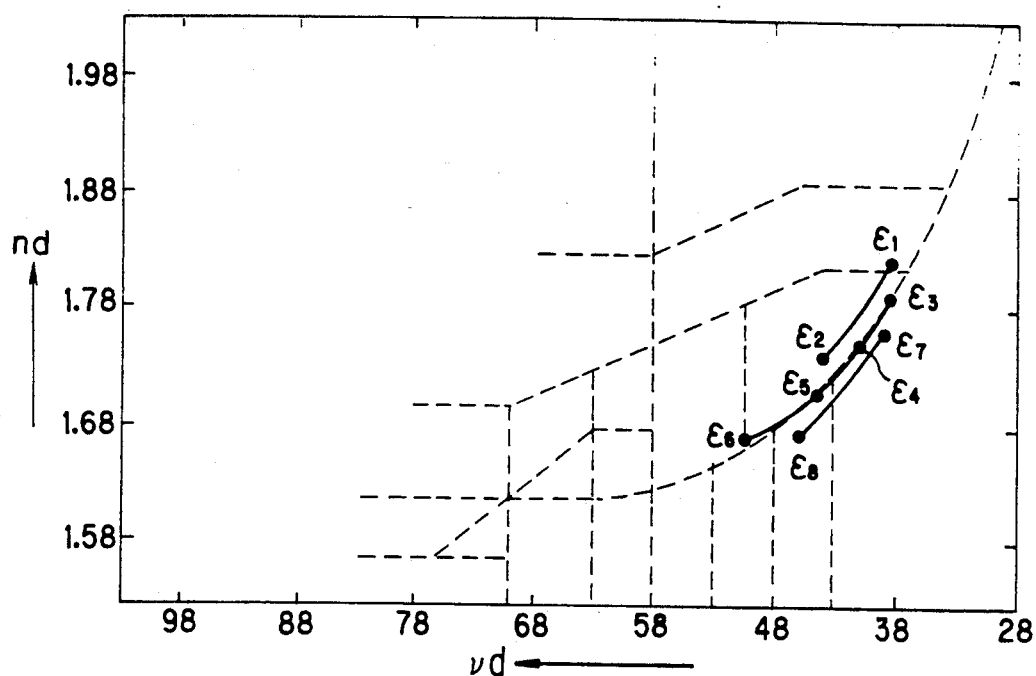

The properties glass obtained from Table 2 can be designated by $v_d$-$n_d$ graph as in FIG. 20 and denoted by segments $\epsilon_3\epsilon_5$, $\epsilon_3\epsilon_4$, $\epsilon_3\epsilon_6$, $\epsilon_7\epsilon_8$ and $\epsilon_1\epsilon_2$ shown in FIG. 20 and it is found that distributed index optical elements having various optical properties can be obtained.

If combinations of metallic salt and metal alkoxide other than the above metallic salt and metal alkoxide are used s raw material, the range of optical properties can be more extended.

Moreover several kinds of metallic salts are induced, various composition distribution imparting can be performed.

FOURTH EMBODIMENT

In order to obtain compositional ratio 80:10:10 of SiO$_2$ constituent, Nb$_2$O$_5$ constituent and TiO$_2$ constituent, 1N-hydrochloric acid including equimolar H$_2$O to silicon tetraethoxide was added in an ethanol solution including silicon tetraethoxide Si(OC$_2$H$_5$)$_4$ of 0.08 mol, thereby effecting partial hydrolyzation, to which ethanol solution an ethanol solution including niobium pentaethoxide Nb(OC$_2$H$_5$)$_5$ of 0.02 mol and titan tetra-n-butoxide Ti(O$^n$C$_4$H$_9$)$_4$ of 0.01 mol was added and thereafter 1N-hydrochloric acid was added to cause hydrolytic reaction and condensation and polymerization reactions, thereby preparing the sol. This sol was poured in a polypropylene container having an inner diameter of 18 mm and it was left to stand and thereafter a wet gel was obtained.

Next, the thus obtained wet gel structure was taken out of the container and dipped in 3N-sulfuric acid for four hours, thereby imparting concentration distribution. After concentration distribution inparting treatment, the gel was washed, dried and sintered, thereby obtaining a glass body having a diameter of 6.4 mm. A diametric refraction index distribution of this glass body was measured and it is found that this glass body has a parabolic refraction index distribution having its properties of Ndo=1.678 at the center portion and a refraction index difference Δn=0.055 an in FIG. 21 by a curve b.

Then, at the time of the sol preparation, for constant compositional ratio of TiO$_2$, the wet sol structure with compositional ratios shown in Table 3 were subjected to the concentration distributing inparting treatmentin the same manner as the previous treatment, thereby forming a glass body. Then, a diametric refraction index distribution of this glass body was measured. As a result of this, the glass body has refraction index distributions as shown in FIG. 21 by curves a, b, c and d.

Figure 24:
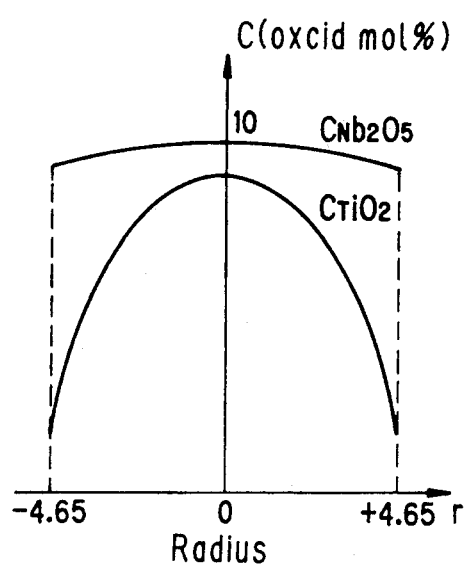
FIG. 24 is n explanatory view showing refraction index and disprersing characteristics of of NbTa in sixth embodiment of the method according to the present invention.
Figure 25:
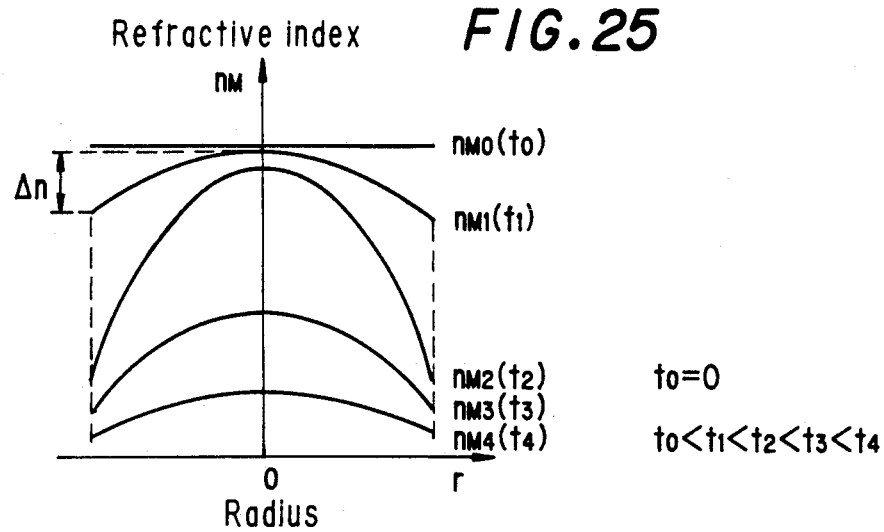
FIG. 25 is an explanatory view showing concentration distribution of metal constituent in glass obtained in sixth embodiment of the method asccording to the present invention.

Also, as shown in FIG. 24, the concentration of Nb constituent is equallydistributed in the glass body and this equally distributed concentration of Nb causes an effect of increasing the value of refraction index as a whole, so that the basic refraction index of its distribution due a convex concentration distribution of Ti constituent can be shifted in the vertical direction as in FIG. 25 by changing compositional ratio of Nb.

Figure 21:
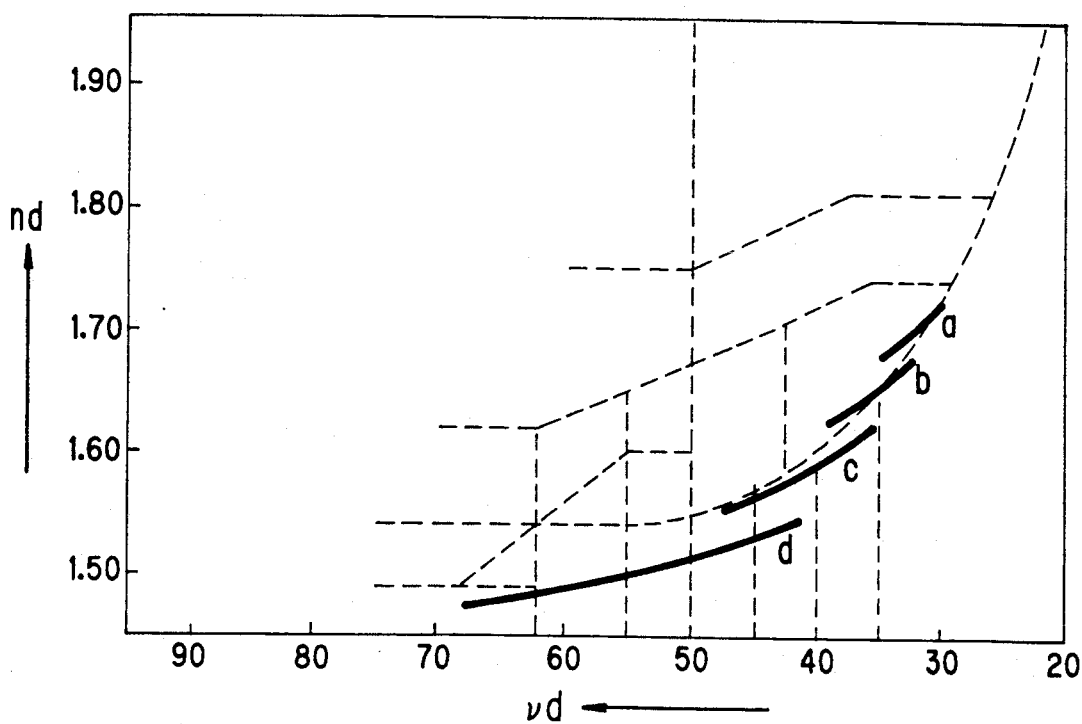
FIG. 21 is an explanatory view showing refractive index distribution of glass obtained by changing amount of Nb in fourth embodiment of the method according to the present invention.

The properties of glass thus obtained can be designated by $v_d$-$n_d$ graph as shown in FIG. 21 and as is found from this figure, various distributed index optical elements having different optical properties can be obtained.

TABLE 3

| | compositional ratio of Oxide (mol ratio) | | |
|---|---|---|---|
| | SiO$_2$ | Nb$_2$O$_5$ | TiO$_2$ |
| a | 75 | 15 | 10 |
| b | 80 | 10 | 10 |
| c | 85 | 5 | 10 |
| d | 90 | 0 | 10 |

FIFTH EMBODIMENT

In order to obtain conpositional ratio 90:5:5 of SiO$_2$ consutituent, Ta$_2$O$_5$ constituent and TiO$_2$ consutituent, Ta(OC$_2$H)$_5$ of 0.010 mol and Ti(O$^n$C$_4$H$_9$)$_4$ of 0.005 mol were added in an ethanol solution including Si(OCH$_3$)$_4$ of 0.090 mol, to which ethanol solution hydrochloric acid was added to prepare the sol. This sol was poured in a polypropylene container having an inner diameter of 18 mm and it was left to stand and thereafter a wet gel was obtained.

Figure 22:
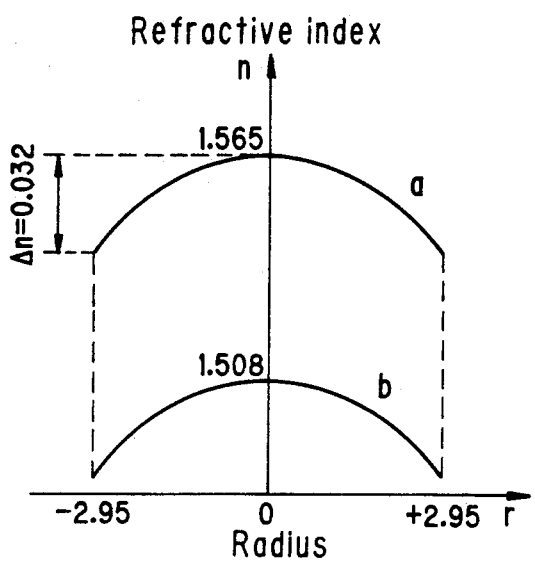
FIG. 22 is an explanatory view showing refraction index and disprersing characteristics of of Nb in fourth embodiment of the method according to the present invention.
Figure 23:
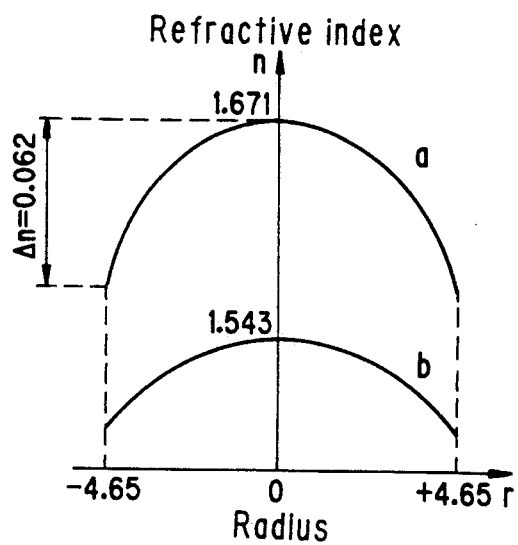
FIG. 23 is an explanatory view showing refraction index and disprersing characteristics of of Nb in fifth embodiment of the method according to the present invention.

Next, the thus obtained wet gel structure was taken out of the container and dipped in 3N-sulfuric acid, thereby imparting concentration direction. After such imparting treatment, the gel was washed, dried, and sintered, thereby obtaining a glass body having a diameter of 5.9 mm. A diametric refraction index distribution of this glass body was measured and it is found that this glass body has a parabolic refraction index distribution having its properties of N$_{do}$=1.565 at the center portion and a refraction index difference Δn=0.032 as in FIG. 22 by a curve a. Also, the concentration of Ta constituent is equally distributed in the glass body, so that when the glass body was formed with compositional ratio of SiO$_2$:TiO$_2$=95:5, the glass body has a refraction index distribution shown in FIG. 22 by a curve b. Therefore, the equal distributed concentration of Ta causes an effect of increasing the value of refraction index as a whole, so that even if Ta is used as metal having small distribution forming speed, the same effect can be obtained. That is, the basic refraction index of its distribution due to a convex concentration distribution of Ti constituent can be shifted as in FIG. 23 by changing compositional ratio of Ta.

SIXTH EMBODIMENT

In order to obtain compositional ratios 80:10:10 of SiO$_2$ constituent, Nb$_2$O$_5$ constituent and TiO$_2$ constituent, niobium pentaethoxide Nb(OC$_2$H$_5$)$_5$ of 0.02 mol and titan tetra-n-butoxide Ti(O$^n$C$_4$H$_9$)$_4$ of 0.01 mol was added in an ethanol solution including silicon tetraethoxide Si(OC$_2$H$_5$)$_4$ of 0.08 mol, to which ethanol solution hydrochloric acid was added, thereby preparing the sol. This sol was poured in a polypropylene container having an inner diameter of 31 mm and it was left to stand and thereafter a wet gel was obtained.

Next, the thus obtained wet gel was taken out of the container and dipped in 3N-sulfuric acid for 24 hours, thereby imparting concentration distribution. After imparting treatment, the gel was washed, dried and sintered, thereby obtaining a glass body having a diameter of 9.3 mm. A diametric refraction index distribution of this glass body was mezsured and it is found that this glass body has a parabolic refraction index distribution having its properties of $N_{do}=1.671$ at the center portion and a refraction index difference $\Delta n=0.062$ as in FIG. 23 by a curve a.

Similarly, the gel formed with compositional ratio of $SiO_2:TiO_2=90:10$ was subjected to the concentration distributing imparting treatment in the same manner as the previous treatment, thereby forming a glass body (FIG. 24). The optical property of the glass body is compared with the property shown in FIG. 23 by a curve b and found that the value of refraction index was increased as a whole, so that even if the concentration distribution of Nb constituent has a slightly convex shape, the same effect can be obtained. It is found that the basic refraction index of its distribution due to a convex concentration distribution of Ti constituent can be shifted as in FIG. 23 by changing compositional ratio of Nb constituent.

The above described embodiments show a method of manufacturing distribution index optical elements having the refraction index distribution in the diametrical direction, but distribution index optical elements having the refraction index distribution in the direction of optical axis can also be manufactured by changing the formation of gel and the method of dipping the gel in a refraction index distribution imparting solution.

SEVENTH EMBODIMENT

At first, aqueous solution of 1/100 N—HCl of 4 mol and ethanol of 4.5 mol was added to a solution including $Si(OCH_2)_4$ of 1 mol and 15 mol % of $Ti(O^nC_4H_9)_4$ to effect hydrolyzation and a wet gel was formed by gelling the obtained solution in a glass container having an inner diameter of 20 mm. A part of the gel was dipped in 500 ml of 3N—HCl solution of 0.1 mol/l including Ti in which the concentration of Ti is lower than the concentration of Ti in the gel for 24 hours. Then, the gel was dried at 100° C. and sintered in an electric furnace of 1100° C. to effect vitrification, thereby obtaining a glass rod having a diameter of about 10 mm.

Figure 26:
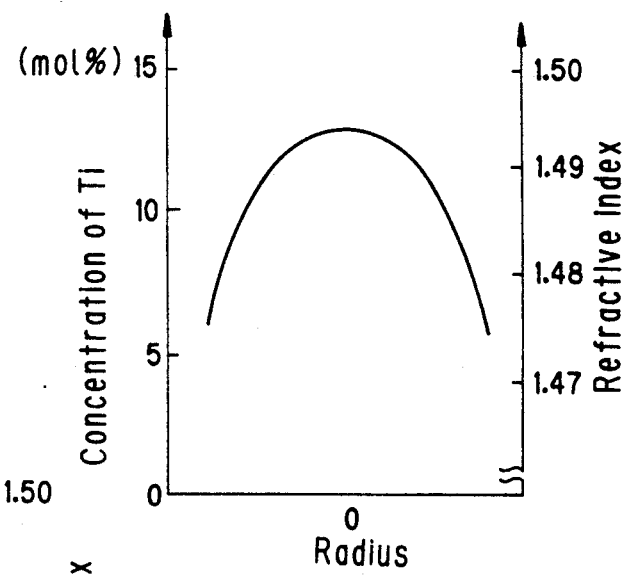
FIG. 26 is an explanatory view showing concentration didtribution and distributed index of Ti in a glass rod obtained in seventh embodiment of the method according to the present invention.
Figure 27:
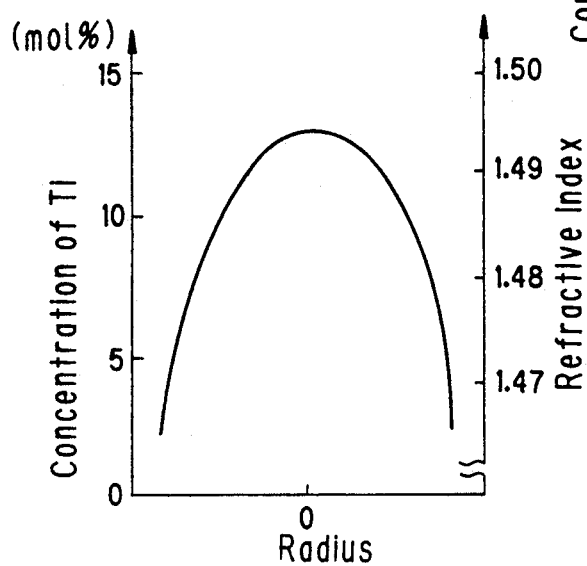
FIG. 27 is an explanatory view showing concentration distribution and refractive index distribution and refractive index distribution of Ti in case of no Ti in a solusion in seventh embodiment of the method according to the present invention.

This glass rod was cut at right angles its axis and a diametric concentration distribution of Ti constituent of the glass rod was measured. The glass rod has a parabolic concentration distribution having a high refrection index at the center portion and a low refraction index at the peripheral portion. Similarly, a glass rod was obtained with the use of eluation including no Ti constituent and its concentration distribution is shown in FIG. 27. As compared with FIGS. 26 and 27 it is found that the concentrations of Ti at the center portion are substantially the same, but the concentration of Ti at the peripheral portion are different to each other, so that the concentration distribution of the glass rod can be controlled by changing the concentration of Ti constituent in the eluation.

EIGHTH EMBODIMENT

At first, aqueous solution of 1/100 N—$NH_4OH$ of 4 mol and ethanol of 4.5 mol was added to a 1 mol of $Si(OC_2H_5)_4$ solution including $Zr(O^nC_4H_9)_4$ of 15 mol % and $Ti(O^nC_4H_9)_4$ of 15 mol % to effect hydrolyzation and a wet gel was formed by gelling the thus obtained solution in a glass container having an inner diameter of 20 mm. A part of the gel was dipped in $3N—H_2SO_4$ solution of 0.15 mol/l including Zr in which the concentration of Zr is lower than the concentration of Zr in the gel for 20 hours. Then, the gel was dried at 100° C. and sintered in an electric furnace of 1200° C. to effect vitrification, thereby obtaining a glass rod having a diameter of 10 mm.

Figure 28:
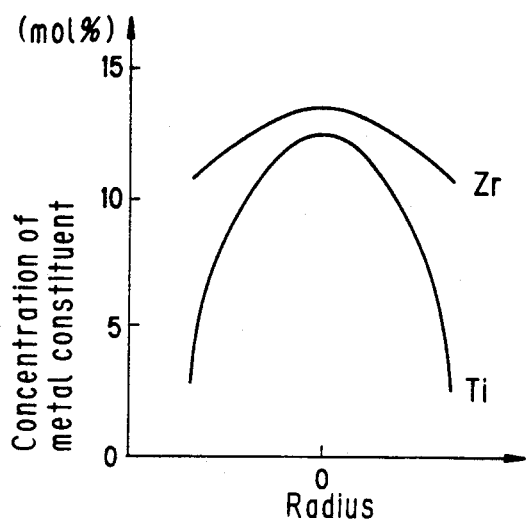
FIGS. 28 and 29 are explanatory views showing concentration distributions of Zr and Ti in eighth and nineth embodiments of method according to the present invention.

This glass rod was cut at right angles to its axis and a diametric concentration distributions of Zr constituent and Ti constituent of the glass rod was measured. The glass rod has a parabolic concentration distributions having a high refraction index at the center portion and a low refraction index at the peripheral portion as in FIG. 28.

NINTH EMBODIMENT

At first, aqueous solution of 1/100 N—$NH_4OH$ of 4 mol and ethanol of 4.5 mol was added to a 1 mol of $Si(OC_2H_5)_4$ solution including $Zr(O^nC_4H_9)_4$ of 15 mol % and $Ti(O^nC_4H_9)_4$ of 15 mol % to effect hydrolyzation and a wet gel was formed by gelling the thus obtained solution in a glass container having an inner diameter of 20 mm. A part of the gel was dipped in $3N—H_2SO_4$ solution of 0.05 mol/l including Zr in which the concentration of Zr is lower than the concentration of Zr in the gel for 20 hours. Then, the gel was dried at 100° C. and sintered in an electric furnace of 1200° C. to effect vitrification, thereby obtaining a glass rod having a diameter of 10 mm.

Figure 29:
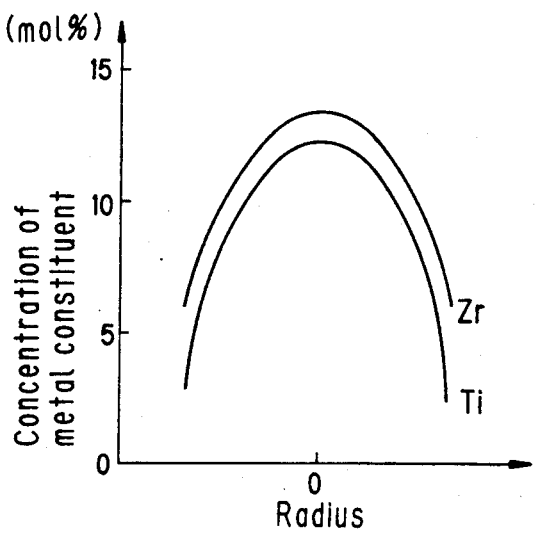

This glass rod was cut at right angles to its axis and a diametric concentration distributions of Zr constituent and Ti constituent of the glass rod was measured. The glass rod has a parabolic concentration distributions having a high refraction index at the center portion and a low refraction index at the peripheral portion as in FIG. 29.

In this case, as shown in the eighth embodiment and nineth embodiment, the concentration distribution of Zr constituent can be controlled by changing the concentration of Zr in the eluation, so that various refraction index distribution can be obtained.

TENTH EMBODIMENT

At first, aqueous solution of 1/100 N-HCl of 4 mol and ethanol of 4.5 mol was added to a 1 mol of $Si(OCH_3)_4$ solution including $Nb(OC_2H_5)_5$ of 15 mol % and $B(OC_2H_5)_5$ of 15 mol % to effect hydrolyzation and a wet gel was formed by gelling the thus obtained solution in a glass container having an inner diameter of 20 mm. This gel was dipped in 3N-HCl solution including Nb of 0.3 mol/l and Na of 0.2 mol/l in which the concentration of Nb is lower than the concentration of Nb in the gel for 16 hours. Then, the gel was dried at 100° C. and sintered in an electric furnace of 950° C. to effect vitrification, thereby obtaining a glass rod having a diameter of 10 mm.

Figure 30:
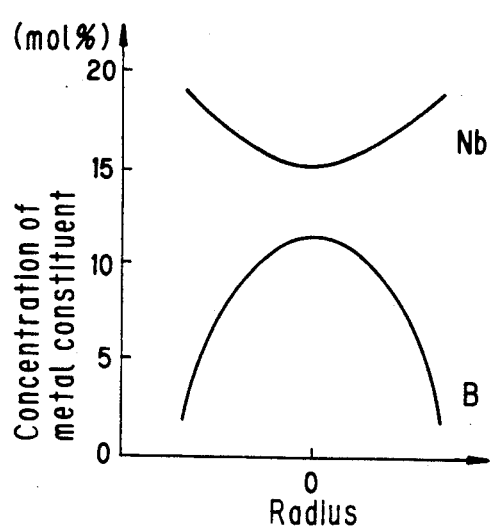
FIG. 30 is an explanatory view showing concentration distribution of Nb and B in tenth embodiment of the method according to the present invention.

This glass rod was cut at right angles to its axis and a diametric concentration distributions of Zr constituent and Ti constituent of the glass rod was measured. The glass rod has a parabolic concentration distributions having a high refraction index at the center portion and a low refraction index at the peripheral portion having upper convex and lower convex as in FIG. 30.

Figure 31:
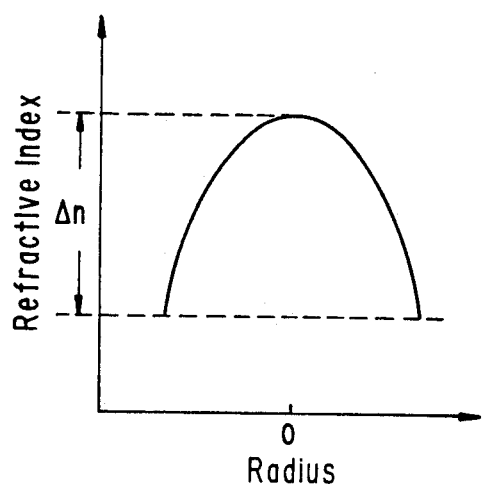
FIG. 31 is an explanatory view showing distributed index of glass of conventional method.

Moreover, the refraction index distribution of this glass rod was measured and it is found that it has a parabploc shape having a low center portion and a high peripheral portion as shown in FIG. 31. If Na is included in the eluation Na can be induced during gel dipping.

What is claimed is:

1. A method of manufacturing distributed index optical elements, comprising the steps of: preparing silica sol including at least one metal dopant other than silicon; subjecting the silica sol to a gelling treatment to form a wet silica gel; dipping the wet silica gel in an elute to selectively extract by elution a part of the at least one metal dopant other than silicon from the wet silica gel to thereby impart a concentration distribution of the at least one metal dopant in the silica gel; and drying and sintering the silica gel.

2. A method of manufacturing distributed index optical elements as claimed in claim 1; wherein said at least one metal dopant comprises plural metal dopants provided by at least one metal alkoxide and at least one metallic salt; and wherein said elute has the property of eluting from the wet silica gel some of each metal dopant which is provided by a metallic salt.

3. A method of manufacturing distributed index optical elements as claimed in claim 1; wherein said silica gel includes a plurality of metal dopants, at least two of the metal dopants being provided by metal alkoxides, only a part of these metal dopants being selectively eluted from the wet silica gel.

4. A method of manufacturing distributed index optical elements as claimed in claim 3; wherein metal dopants other than said selectively eluted dopants include at least ions of either Nb or Ta.

5. A method of manufacturing distributed index optical elements as claimed in claim 1; wherein the elute comprises a solution including at least one of the metal dopants included in the silica gel.

6. A method of manufacturing distributed index optical elements as claimed in claim 3; wherein one of said at least two of the metal dopants is selected from a group of metal dopants having reltively small eluting speed and the other of said at least two of the metal dopants is selected from a group of metal dopants having relatively large eluting speed.

7. A method of manufacturing distributed index optical elements as claimed in claim 6; wherein said metal dopant group having relatively small eluting speed comprises ions of Nb and Ta and said metal dopant group having relatively large eluting speed comprises ions of Ti, Zr, La, Y, Ge, Pb, Ba, Sr, Ca and Zn.

8. A method of manufacturing distributed index optical elements as claimed in claim 5; wherein said elute solution comprises an acid.

9. A method of manufacturing distributed index optical elements as claimed in claim 2; wherein said metallic salt and said metal alkoxide include the same metal dopant.

10. A method of manufacturing distributed index optical elements as claimed in claim 2; wherein said metallic salt and said metal alkoxide include different metal dopants.

11. A method of manufacturing distributed index optical elements as claimed in claim 1; wherein said silica gel includes a plurality of metal dopants, one of these metal dopants being provided by a metallic salt and a metal alkoxide including the same metal as the metallic salt, and another of these metal dopants being provided by a metal alkoxide including a metal different from the metallic salt; and wherein said elute has properties of eluting metal dopants provided by the metallic salt.

12. A method of manufacturing distributed index optical elements as claimed in claim 3; wherein the two metal dopants provided by metal alkoxides have different eluting speeds.

13. A method of manufacturing distributed index optical elements as claimed in claim 12; wherein the dipping step comprises dipping the silica gel in the elute for a length of time such that the concentration distribution of one of the metal dopants is substantially not changed.

14. A method of manufacturing distributed index optical elements as claimed in claim 12; wherein the dipping step comprises dipping the silica gel in the elute for a length of time such that the concentration distribution is imparted to either of the two metal dopants.

15. A method of manufacturing distributed index optical elements, comprising the steps of: preparing silica sol including at least one metal dopant; subjecting the silica sol to a gelling treatment to form a wet silica gel; dipping the silica gel in an elute solution including the same metal dopant as said one metal dopant to thereby impart a concentration distribution of the one metal dopant in the silica gel by extracting by elution some of the one metal dopant from the wet silica gel; and drying and sintering the silica gel.

16. A method of manufacturing distributed index optical elements as claimed in claim 12; wherein said elute solution includes the same metal dopant as at least one of the metal dopants included in the silica gel but with a concentration lower than that in the silica gel.

17. A method of manufacturing distributed index optical elements as claimed in claim 12; wherein said elute solution includes the same metal dopant as at least one of the metal dopants included in the silica gel but with a concentration higher than that in the silica gel.

18. A method of manufacturing distributed index optical elements as claimed in claim 12; wherein said elute solution includes a metal which is not included in the silica gel.

19. A method of manufacturing distributed index optical elements, comprising the steps of: preparing silica sol including at least one metal dopant other than silicon, each metal dopant being provided by a different source material; subjecting the silica sol to a gelling treatment to form a wet silica gel; dipping the silica gel in an elute to selectively extract by elution a part of the metal dopants other than silicon from the wet silica gel to thereby impart a concentration distribution of the metal dopants in the gel; and drying and sintering the silica gel.

20. A method of manufacturing distributed index optical elements as claimed in claim 19; wherein said elute has properties such that the metal dopant provided from one source material of metal dopants included in the wet silica gel is eluted and the metal dopant provided from the other source material is not eluted.

21. A method of manufacturing distributed index optical elements, comprising the steps of: preparing silica sol including a plurality of metal dopants other than silicon; subjecting the silica sol to a gelling treatment to form a wet silica gel; dipping the silica gel in an elute to selectively extract by elution a part of the metal dopants other than silicon from the wet silica gel to thereby impart a concentration distribution of the metal dopants in the gel; and drying and sintering the silica gel.

22. A method of manufacturing distributed index optical elements as claimed in claim 1; wherein said elute includes a metal which is not included in the silica gel.

* * * * *